United States Patent
Therene et al.

(10) Patent No.: US 8,145,978 B2
(45) Date of Patent: *Mar. 27, 2012

(54) RAID ARRAY AUTO-INITIALIZATION (RAAI) METHOD

(75) Inventors: Christophe Therene, Livermore, CA (US); James R. Schmidt, Fremont, CA (US)

(73) Assignee: Summit Data Systems LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,526

(22) Filed: Jun. 29, 2011

(65) Prior Publication Data

US 2011/0258387 A1    Oct. 20, 2011

Related U.S. Application Data

(63) Continuation of application No. 11/717,318, filed on Mar. 13, 2007, now Pat. No. 7,979,773.

(51) Int. Cl.
*G11C 29/00* (2006.01)
(52) U.S. Cl. .......... 714/770; 714/752; 714/806
(58) Field of Classification Search ............ 714/770, 714/752, 710, 764, 806, 52
See application file for complete search history.

(56) References Cited

U.S. PATENT DOCUMENTS

| 5,859,965 A * | 1/1999 | Gittins et al. ............ 714/52 |
| 6,704,837 B2 * | 3/2004 | Beardsley et al. ............ 711/114 |
| 6,775,792 B2 * | 8/2004 | Ulrich et al. ............ 714/6.12 |

* cited by examiner

*Primary Examiner* — Fritz Alphonse

(74) *Attorney, Agent, or Firm* — Law Office of Gerald Maliszewski; Gerald Maliszewski

(57) ABSTRACT

A system and method are provided for efficiently initializing a redundant array of independent disks (RAID). The method monitors host write operations and uses that information to select the optimal method to perform a parity reconstruction operation. The bins to which data access write operations have not occurred can be initialized using a zeroing process. In one aspect, the method identifies drives in the RAID array capable of receiving a 'WriteRepeatedly' command and leverages that capability to eliminate the need for the RAID disk array controller to provide initialization data for all disk array initialization transfers. This reduces the RAID array controller processor and I/O bandwidth required to initialize the array and further reduces the time to initialize a RAID array. In a different aspect, a method is provided for efficiently selecting a host write process for optimal data redundancy and performance in a RAID array.

11 Claims, 14 Drawing Sheets

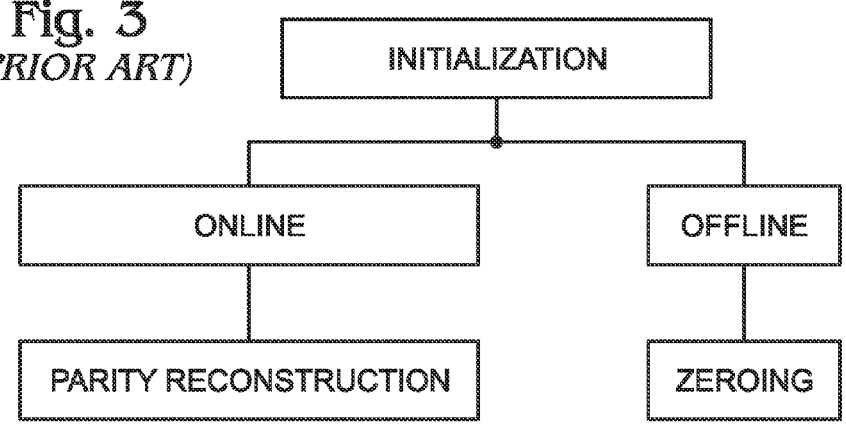
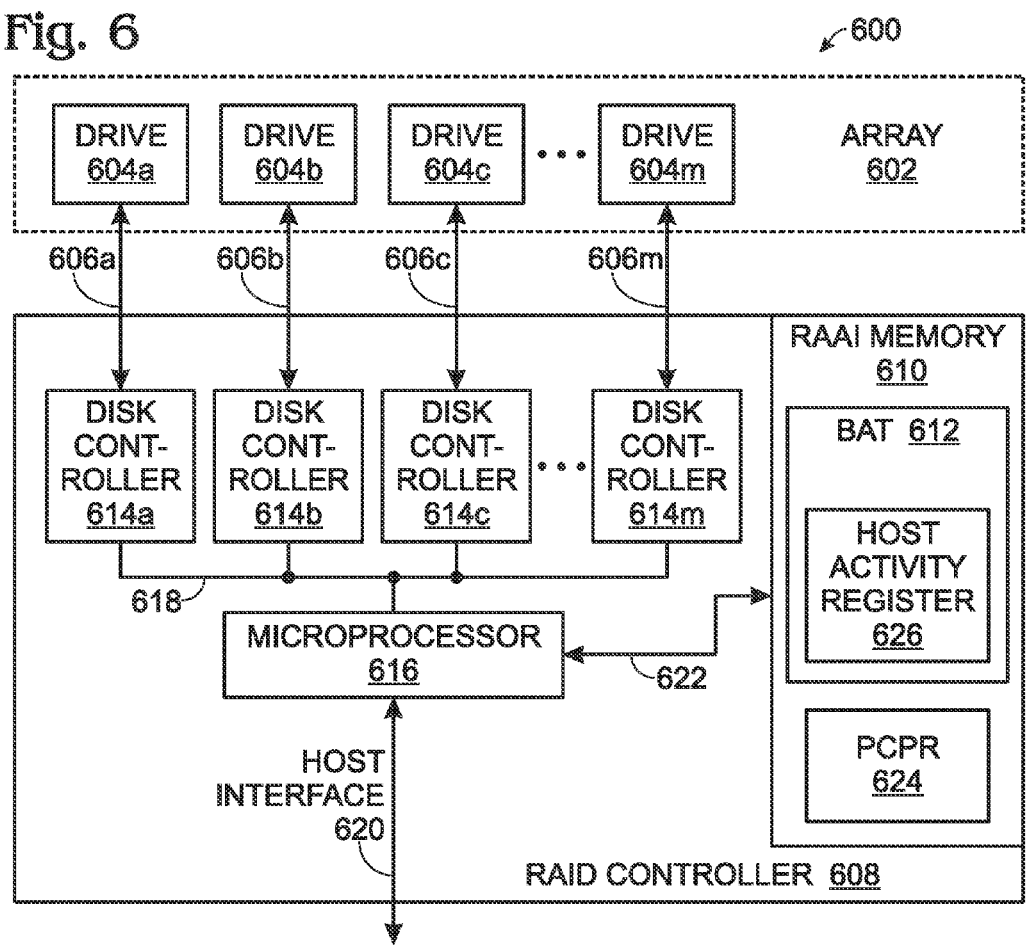

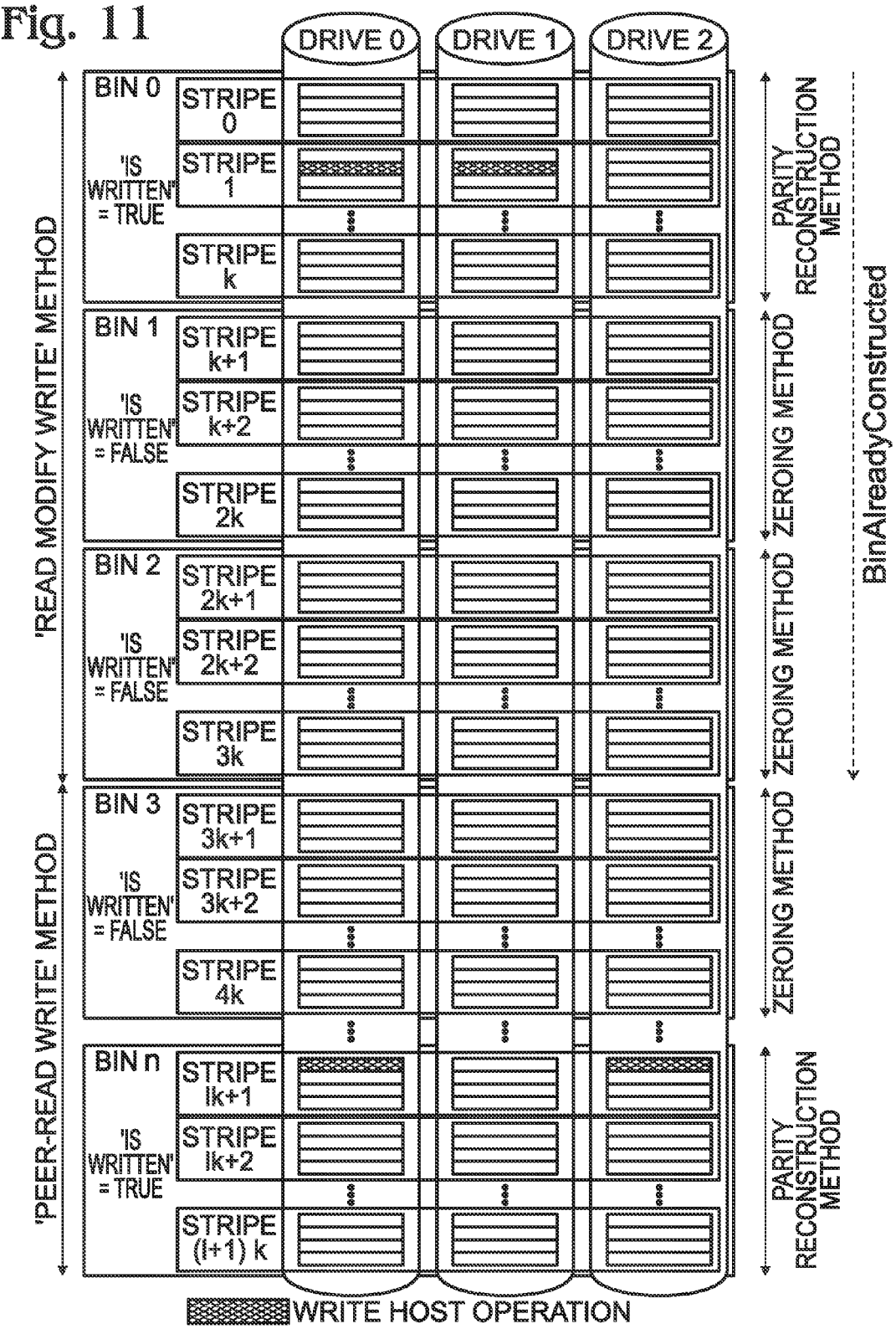

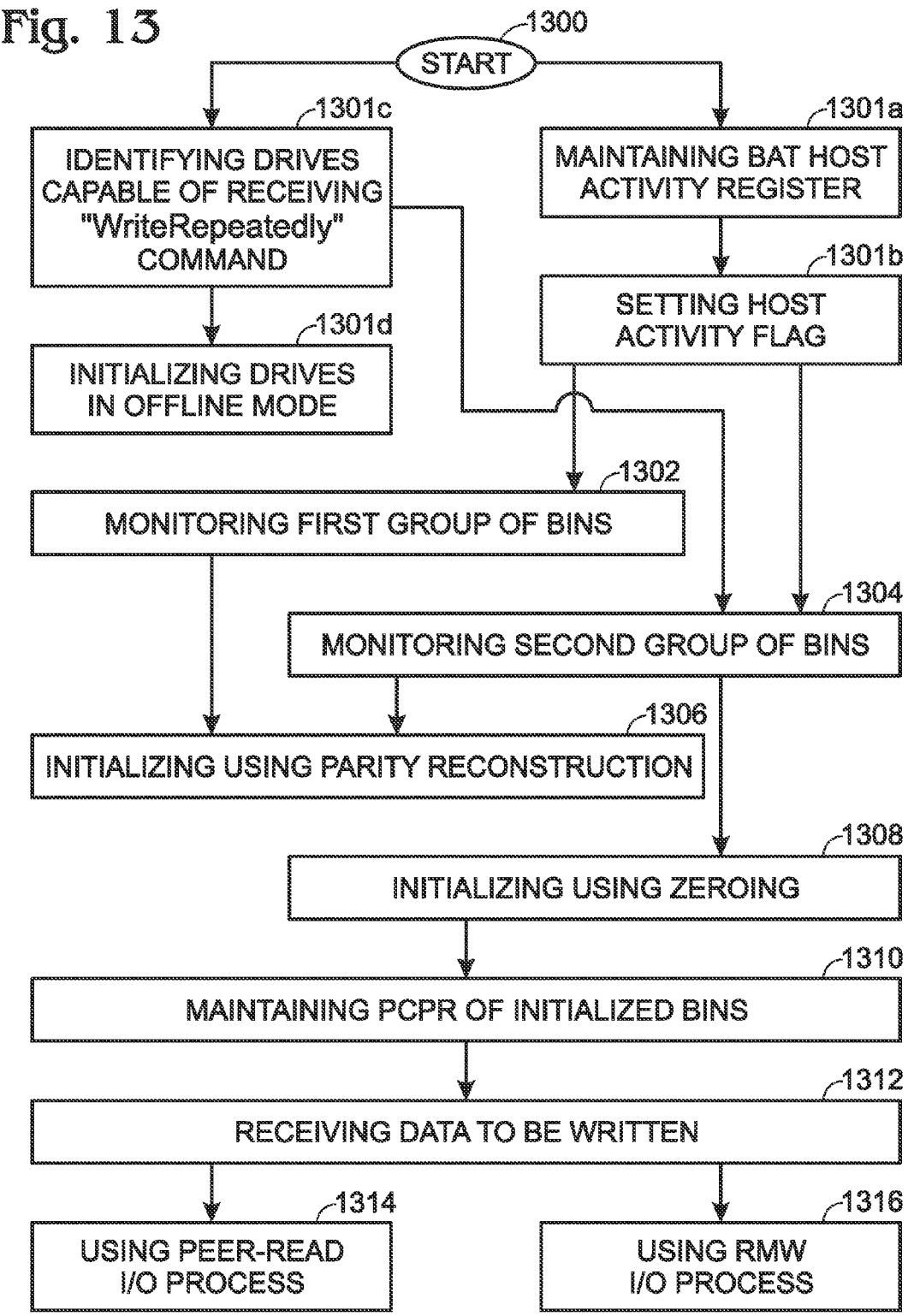

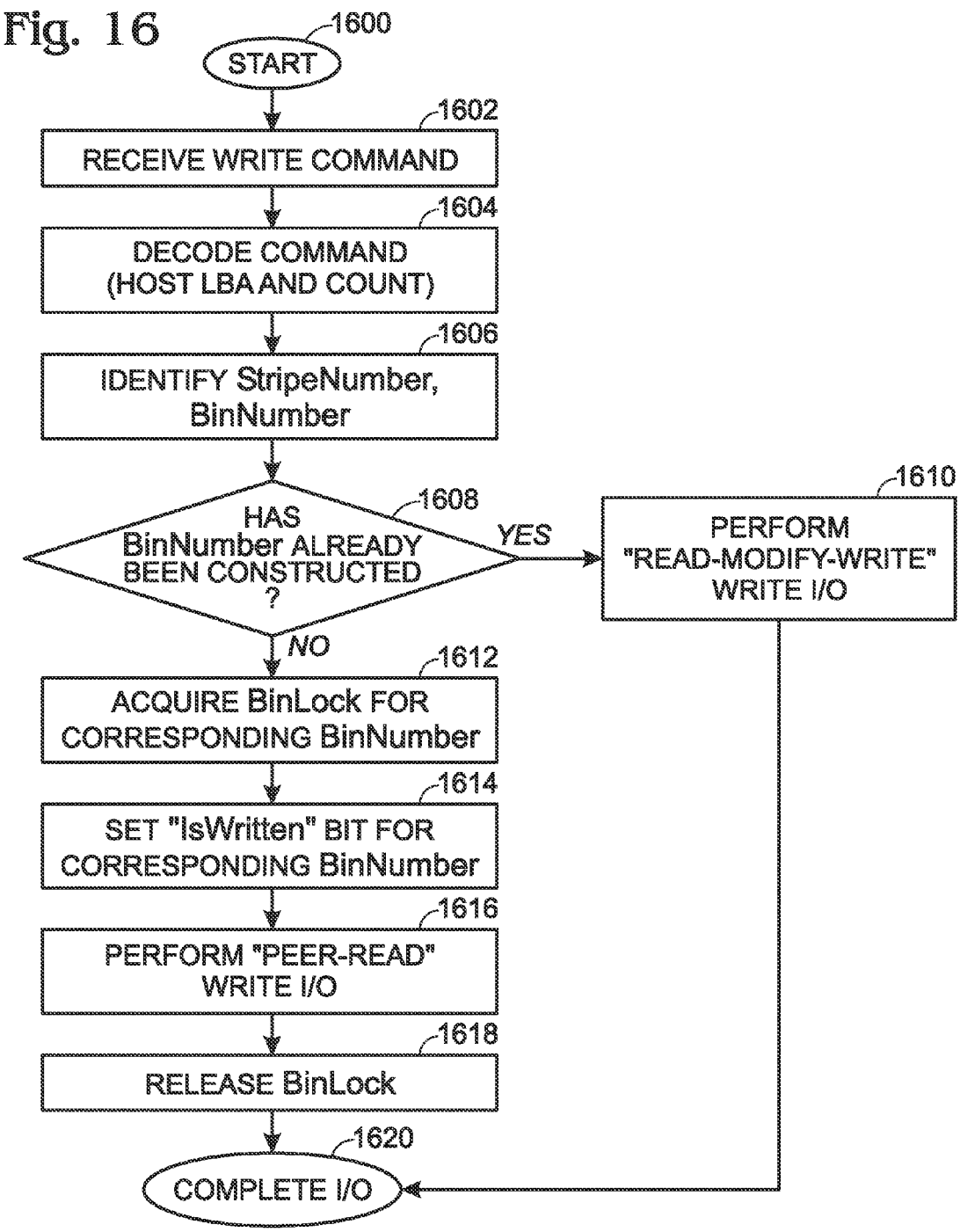

RAID ARRAY AUTO-INITIALIZATION (RAAI) METHOD

RELATED APPLICATIONS

This application is a Continuation of a patent application entitled, RAID ARRAY AUTO-INITIALIZATION (RAM), invented by Chris Therene et al., Ser. No. 11/717,318, filed Mar. 13, 2007, now U.S. Pat. No. 7,979,773 which is incorporated herein by reference.

BACKGROUND OF THE INVENTION

1. Field of the Invention

This invention, generally relates to information storage technology and, more particularly, to a system and method for efficiently initializing and writing to a redundant array of independent disks (RAID).

2. Description of the Related Art

RAID is a technology that stores data by using multiple hard drives, connected in parallel to share and duplicate data. The data is stored in such a way that all stored data can be recovered if one of the hard drives fails. There are many configurations of the RAID, which are typically referred to as the RAID level. As seen from the point of view of a host-connected operating system, the RAID combination of multiple hard drives appears as a single logical unit (e.g., a single hard drive).

As used herein, the term "striplet" is used to describe a user-defined size block of data written, to one drive. The term "stripe" describes a plurality of adjacent, related striplets across each disk. In RAID 5 and RAID 6, a collection of striplets forms a consistent, identifiable stripe with some of the striplets comprising data and the others comprising parity data. For RAID 5, one of the striplets in each stripe is designated as a parity striplet. This striplet is the product of an exclusive-or (XOR) operation that has been performed with all the other striplets in the stripe. The operation for XOR'ing data to create a parity striplet is referred to as P-calculation. The purpose of the parity is to provide a level of redundancy. Since the RAID depicts a virtual disk with multiple physical disks, there is a higher probability of one the individual physical disks may fail. If one of the striplets cannot be read due to an individual disk error or failure, the data for that striplet can be reassembled by XOR'ing all the other striplets in the stripe.

FIG. 1 is a schematic block diagram of a RAID 5 array depicting the organization of parity and data striplets into stripes (prior art). The redundancy of RAID 5 can accommodate one failure within a stripe. RAID 6, in addition to the "P-striplet", allocates one or more "Q-striplets" to accommodate two or more failures. The operation for calculating Q data involves Galois arithmetic applied to the contents of the other striplets in the stripe.

As compared to earlier RAID levels, RAID 5 and 6, other than offering increased fault resiliency, also provide better performance when reading from the virtual disk. When multiple read commands are queued for the RAID'ed disks, the operations can be performed in parallel, which can result in a significant increase in performance as compared to similar operations to a single disk. If, however, there is a failure reading the requested data, then all the remaining data of the stripe needs to be read to calculate the requested data.

For operations that write data to the RAID'ed disks, performance can be adversely affected due to the P and Q calculations necessary to maintain redundant information per stripe of data. In RAID 5, for every write to a striplet, the previously written data to that striplet needs to be XOR'ed with the P-striplet, effectively removing the redundant information of the "old" data that is to be overwritten. The resulting calculation is then XOR'ed with the new data, and both the new data and the new P-calculation are written to their respective disks in the stripe. Therefore, a RAID 5 write operation may require two additional reads and one additional write over that of a single disk write operation. For RAID 6, there is an additional read and write operation for every Q-striplet.

Therefore, if a RAID array becomes degraded due to a failed disk, and the P/Q parity mechanisms must be invoked to restore the data, it is crucial that the array be properly initialized. Conventionally, RAID arrays are initialized using inefficient brute force approaches.

FIG. 2 is a schematic block diagram of a conventional RAID array controller (prior art). On a "write to disk." operation, the host-generated data is retrieved from the host interface memory through a DMA (direct memory access) mechanism into a write cache. For example, the host may be a computer or other microprocessor driven device enabled through the use of an operating system. The array controller microprocessor moves the data from the write cache through the disk controller onto the disk media. The array controller microprocessor executes its own programs out of the ROM. This simplified block diagram is used for illustrative purposes. An actual. RAID controller would additionally include a number of hardware acceleration features built into it, including P & Q arithmetic calculators, high speed processor RAM, and NVRAM for storing data during power fail, to name a few.

FIG. 3 is a schematic diagram illustrating conventional means for initializing a disk array (prior art). Typically, there are two usage modes, "offline", and "online". While offline, an array remains unavailable for normal data access read/write during initialization. Only after initialization is complete may the array be accessed to write/read content data. There are many advantages to this mode. First, this is the fastest way of initializing. Second, when the initialization completes, the disk array can be verified (a verification that the parity matches the data) as all the stripes in the array have a consistent parity. Since the only writes to the array (and there are no reads) are for initialization, the firmware can initialize the array in the most efficient mode possible, writing large quantities of data with each single command, and writing all drives simultaneously. Since the array data is undetermined prior to initialization, zeroing the array is the only logical mechanism for initialization. There are also a few disadvantages to this method as well. One of the main downsides is that the array is not available until initialization is complete. This method is entirely scalable either if the processor has to be highly involved in the individual disk initializations. Another drawback is that this method is destructive and therefore not suitable for online initialization where host I/Os may coexist.

In the online mode, an array is available for normal data access read/write during initialization. The data written during this usage mode is fully redundant and protected against a disk failure. The advantage of this mode is immediate array availability for normal read/write access. The downside is lower performance of the array until initialization is complete, as the initialization process competes for the disks with host I/Os. Further, initialization is much slower than in offline mode. While online, if a write to the array is less data than a full stripe write, the remainder of the stripe must be read, parity calculated, and then a full stripe write done. This process is referred to as a peer-read process.

FIG. 4 is a diagram illustrating a peer-read input/output (I/O) write operation (prior art). This process allows for full and immediate redundancy of all written data. The inefficiency of the disk accesses, read from other drives not involved in host transfer to form a full stripe, also increases as the number of drives in the array becomes higher. One of the main drawbacks for this scheme is that the parity is consistent with the data only for the portions of the stripes that have been written by the host system. Since the disk array has not been previously initialized, a verification operation on the disk array is not possible and requires a parity reconstruction operation.

Returning briefly to FIG. 1, the RAID 5 array includes M disks. The parity block is shown rotating from striplet to striplet with the progression of stripes through the array. This diagram very generally illustrates the steps used by the online parity reconstruction method. This method reconstructs the parity one stripe at a time, but the reconstruction of multiple stripes can be combined through a higher-level operation to minimize disk seeks. Since this reconstruction method does not know what piece of data/parity set is consistent, it has to reconstruct parities for the whole array.

FIG. 5 is a diagram illustrating the process for parity reconstruction (prior art). If the array is not already initialized, and a Read-Modify-Write I/O process is used to write data, there is no guarantee that the data is truly redundant. That is, the parity matches the data only for the portion of the stripe that have been written, but not for the entire stripe. For this reason, a parity reconstruction operation must be used to enable a verification operation to be performed. Once the parity reconstruct operation passes the written stripe, the full stripe is consistent. However, the operation requires that a full stripe write will be rewritten even though it is actually redundant already.

The above-mentioned processes all suffer from a number of bottlenecks related to array initialization. First, the array controller microprocessor must transfer every byte of data to every disk drive. In a five drive array of 500 gigabyte (GB) disks, this is 5 billion sectors of data. Second, the disk controllers must handle every byte of data. Although there is one disk controller for each drive, each disk controller must still handle (continuing the example) 1 billion sectors of data. This data is all identical zeros data.

Returning to FIG. 2, the processor on the RAID controller detects the number, type, and capacity of connected disk drives, and begins to write a known data pattern (either zeroes, or the data already existing on the drive) with proper parity (in the case of RAID 5 and 6) to each of the drives, either sequentially or in parallel. Normally the initialization data is written in parallel to allow for simultaneous transfer of real application data to the array. In the of case, no data may be written to the drives until after initialization. In essence, the RAID controller processor is directing the write of every block to every drive even tough the data "blocks" that are written might be an aggregated collection of the 512 byte blocks recognized by the disk drive. For example, it would be reasonable to aggregate 128-512 byte blocks into one striplet and write the entire striplet (64K bytes) in a single command. While conceptually easy, this approach rises a lot of the RAID controller processor and I/O bandwidth, for identical data being written to every block on every drive. A 500 Gigabyte drive has one billion 512 byte blocks, which corresponds to a lot of commands to just initialize one drive. This activity is especially significant if there is ongoing I/O to the array, simultaneously during initialization, as a result of some user application reading and writing the array prior to the completion of initialization.

It would be advantageous if a RAID array could be efficiently initialized concurrently with host I/O writes in the online mode, such that the RAID controller processor and I/O can devote themselves to the non-initialization data movement while the initialization goes on in parallel, in the background.

It would be advantageous if a RAID array could be initialized in the offline mode using a minimal numbers of zeros data transfer commands.

SUMMARY OF THE INVENTION

The present invention is a RAID Array Auto-Initialization (RAAI) system and method that significantly decreases the time required for initializing a RAID disk array. RAAI reduces the RAID array controller processor and I/O bandwidth required to initialize the array. RAAI permits an array to be initialized with the above advantages simultaneously with the transfer of live application-created content data to and from the array. These advantages are achieved by optimizing the initialization method and eliminating the need for the RAID disk array controller to provide initialization data for all disk array initialization transfers.

Accordingly, a method is provided for efficiently initializing a redundant array of independent disks (RAID). The method monitors bins (e.g., a first group of bins) a RAID array to which data access write operations have occurred the array is online. Likewise, a second group of bins is monitored to which data access write operations have not occurred while the array is online. As is conventional, the first group of bins is initialized using a parity reconstruction process. However, the present invention method permits the second group of bins to be initialized using a zeroing process. More explicitly, an integral number of RAID array stripes are initialized in the second group of bins, where each bin includes a plurality of data and parity stripes. The initialization uses a plurality of zeroing commands to incrementally write zeros data into every data striplet, and write zeros data into every parity striplet, for each strip in the second group of bins.

In another aspect, the method identifies drives in the RAID array capable of receiving a "WriteRepeatedly" command to write zeros data, where a "WriteRepeatedly" command writes a host-generated data pattern repeatedly to media in an identified drive. Then, the second group of bins can be initialized using the "WriteRepeatedly" command to simultaneously write zeros data into the identified drives. In a different aspect, drives in the RAID array identified as capable of receiving the "WriteRepeatedly" command can be completely initializing while the array is offline by sending a single "WriteRepeatedly" command.

In one aspect, a method is provided for efficiently selecting a host write process for optimal data redundancy and performance in a RAID. The method maintains a parity construction progress record (PCPR) of initialized bins, where each bin includes a plurality of data and parity stripes, and updates the PCPR in response to completing the initialization of a bin. When host-generated data is received to be written into a bin, a peer-read I/O write process is used to write the data into the bin, if the bin not being recorded in the PCPR. Alternately, in response to the bin being recorded in the PCPR, a Read-Modify-Write (RMW) I/O write process is used to write the data into the bin.

Additional details of the above-mentioned methods, and a system for initializing a RAID array are presented below.

BRIEF DESCRIPTION OF THE DRAWINGS

FIG. 3 is a schematic diagram illustrating conventional means for initializing a disk array (prior art).

FIG. 6 is a schematic block diagram of the present invention system for initializing a RAID array.

FIG. 11 is a diagram summarizing the above-mentioned processes for efficiently initializing and writing data into a RAID array.

FIG. 13 is a flowchart illustrating a method for efficiently initializing a RAID array.

FIG. 16 is a flowchart illustrating a method for efficiently selecting a host write process for optimal data redundancy and performance in a RAID.

DETAILED DESCRIPTION

Figure 1:
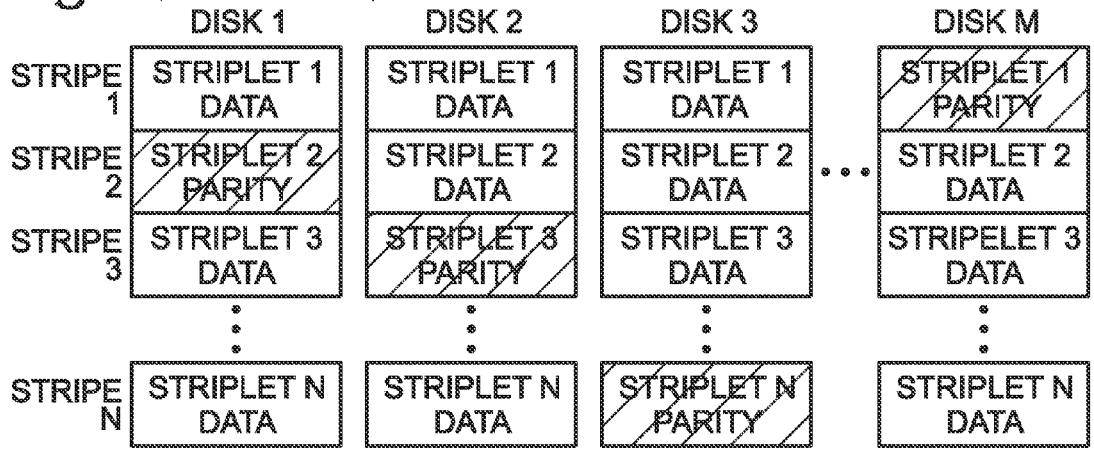
FIG. 1 is a schematic block diagram of a RAID 5 array depicting the organization of parity and data striplets into stripes (prior art).
Figure 2:
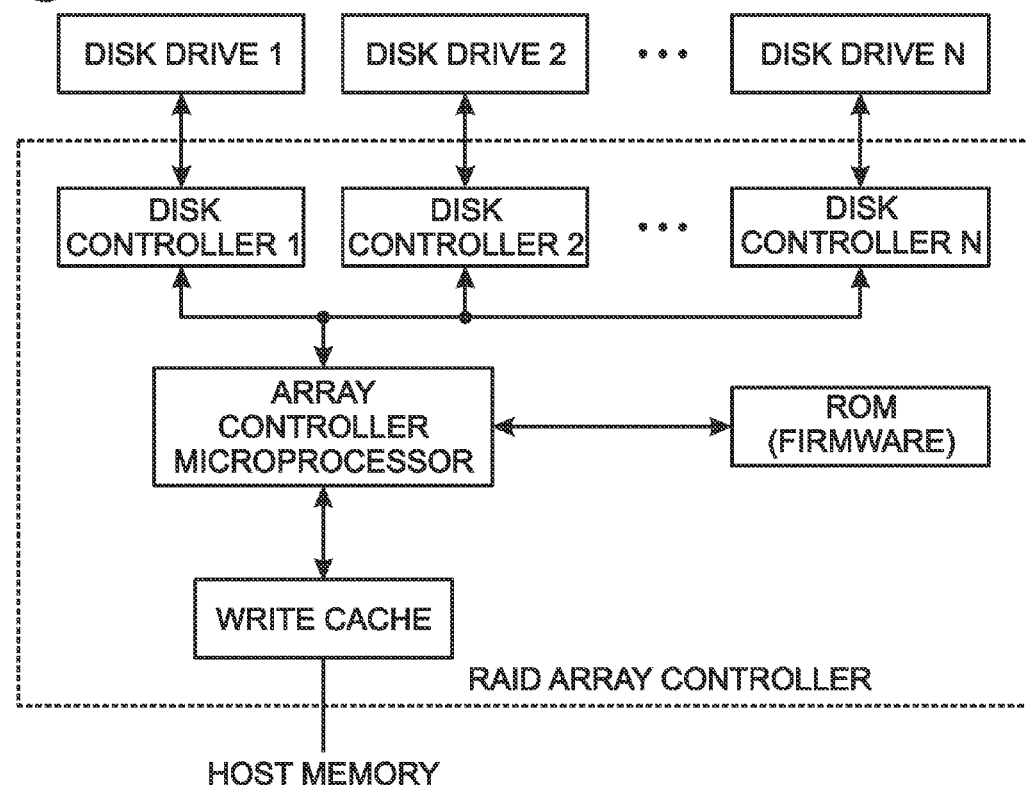
FIG. 2 is a schematic block diagram of a conventional RAID array controller (prior art).
Figure 4:
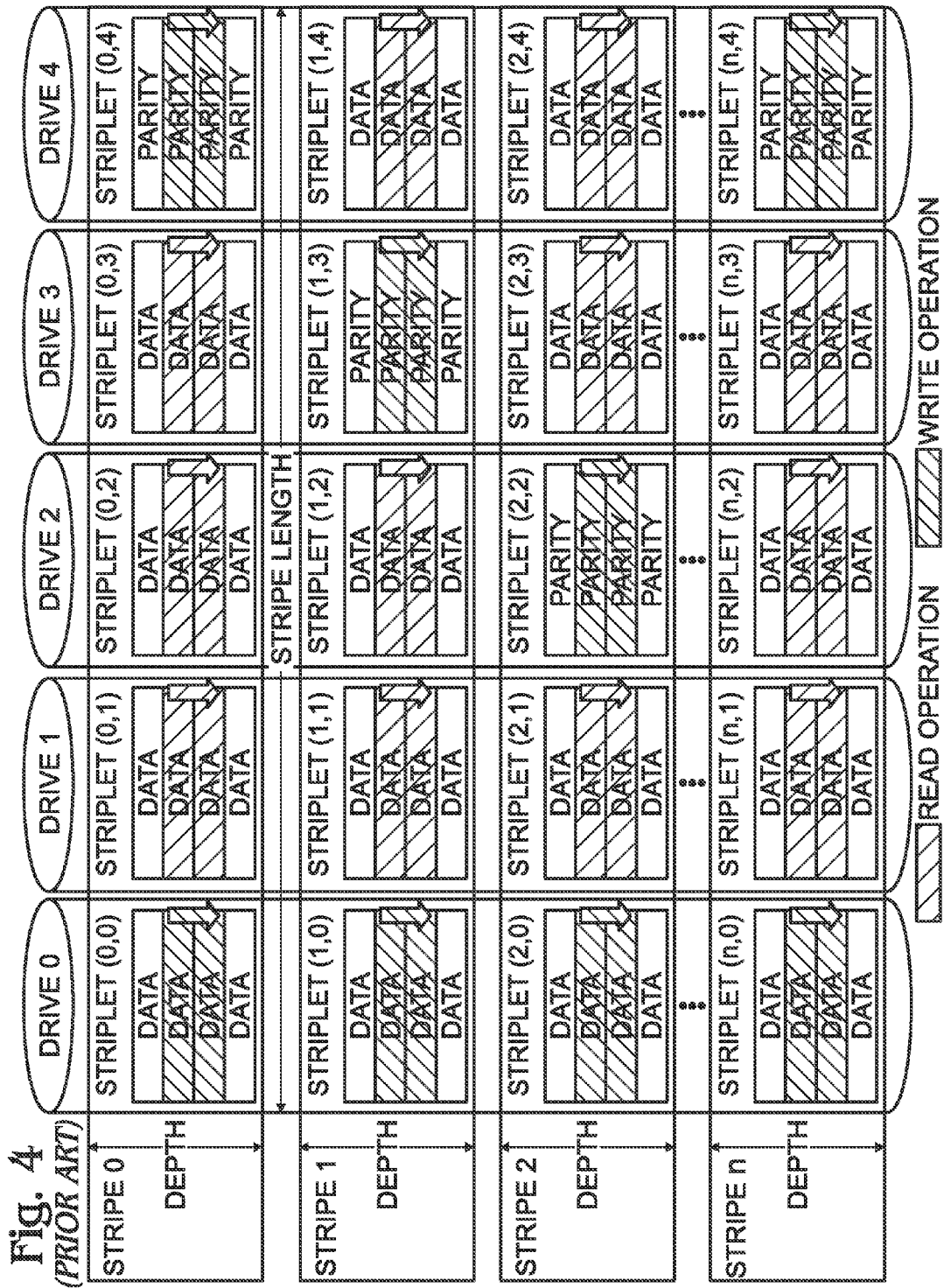
FIG. 4 is a diagram illustrating a peer-read input/output (I/O) write operation (prior art).
Figure 5:
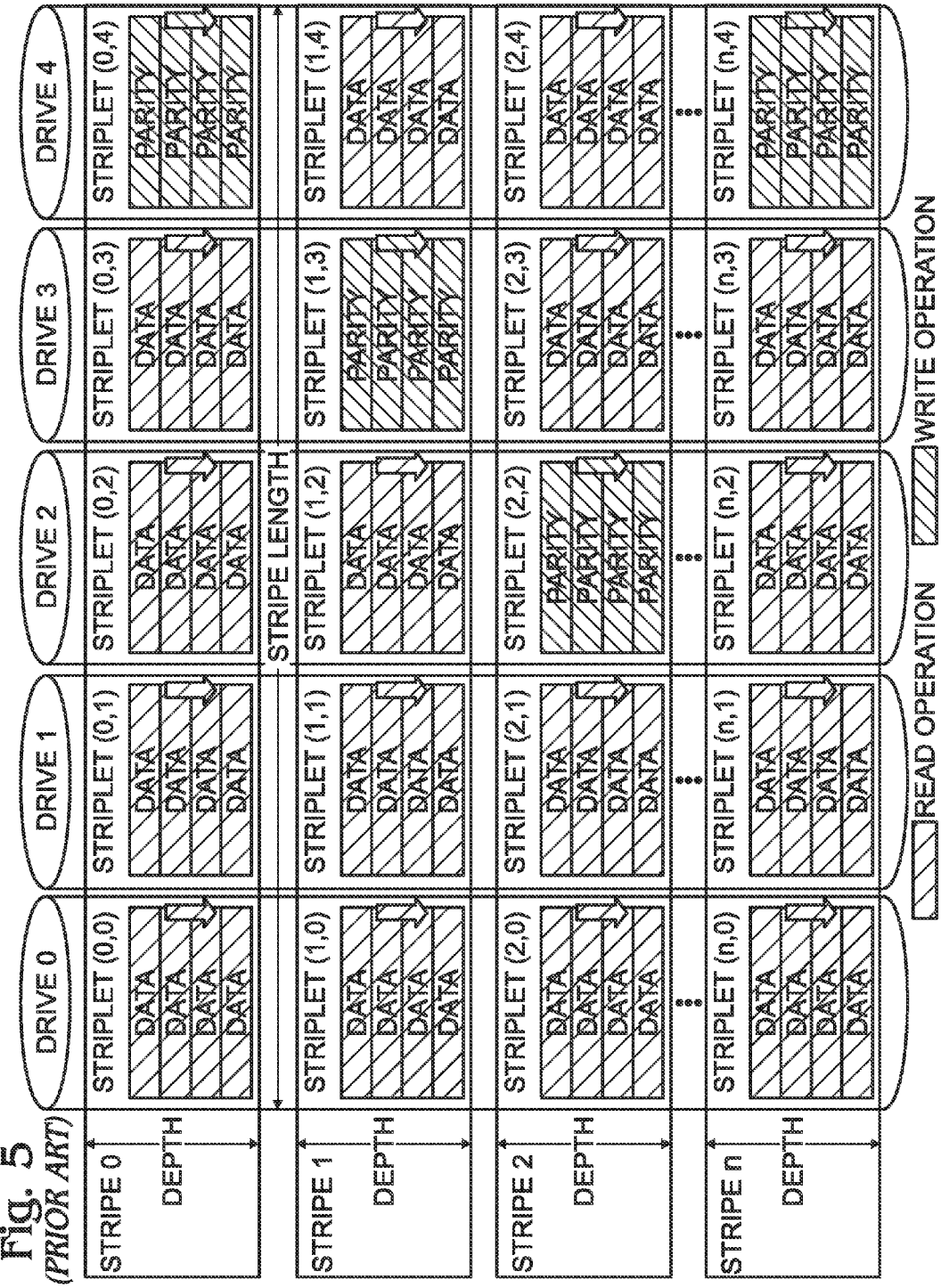
FIG. 5 is a diagram illustrating the process for parity reconstruction (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

FIG. 6 is a schematic block diagram of the present invention system for initializing a RAID array. The system 600 comprises a RAID array 602 of disk drives. Each disk drive 604 has an interface on line 606 to transceive storage data and read/write instructions. Although only four drives are shown (m=4), it should be understood that the array 602 is not limited to any particular number of drives 604. The system 600 further comprises a RAID controller 608 including a RAID array auto initialization (RAAI) memory 610 including a bin access table (BAT) 612 for storing a record of host write activity. The RAID controller 608 also includes a plurality of disk controllers 614. Each disk controller 614 has an interface on line 606 connected to a corresponding disk drive interface.

The RAID controller 608 also includes a microprocessor 616 having an interface on line 618 connected to the plurality of disk controllers 614 to transceive data and to provide disk access instructions. The microprocessor 616 has a host interface on line 620 to transceive storage data, and a RAAI memory interface on line 622. The microprocessor 616 accesses the BAT 612 to monitor a first group of bins in the RAID array to which write operations have occurred while the array is online. The microprocessor 616 also uses the BAT 612 to monitor a second group of bins to which write operations have not occurred while the array is online. The microprocessor 616 directs the disk drive controllers 614 to initialize the first group of bins using a parity reconstruction process, and to initialize the second group of bins using a zeroing process.

Figure 7:
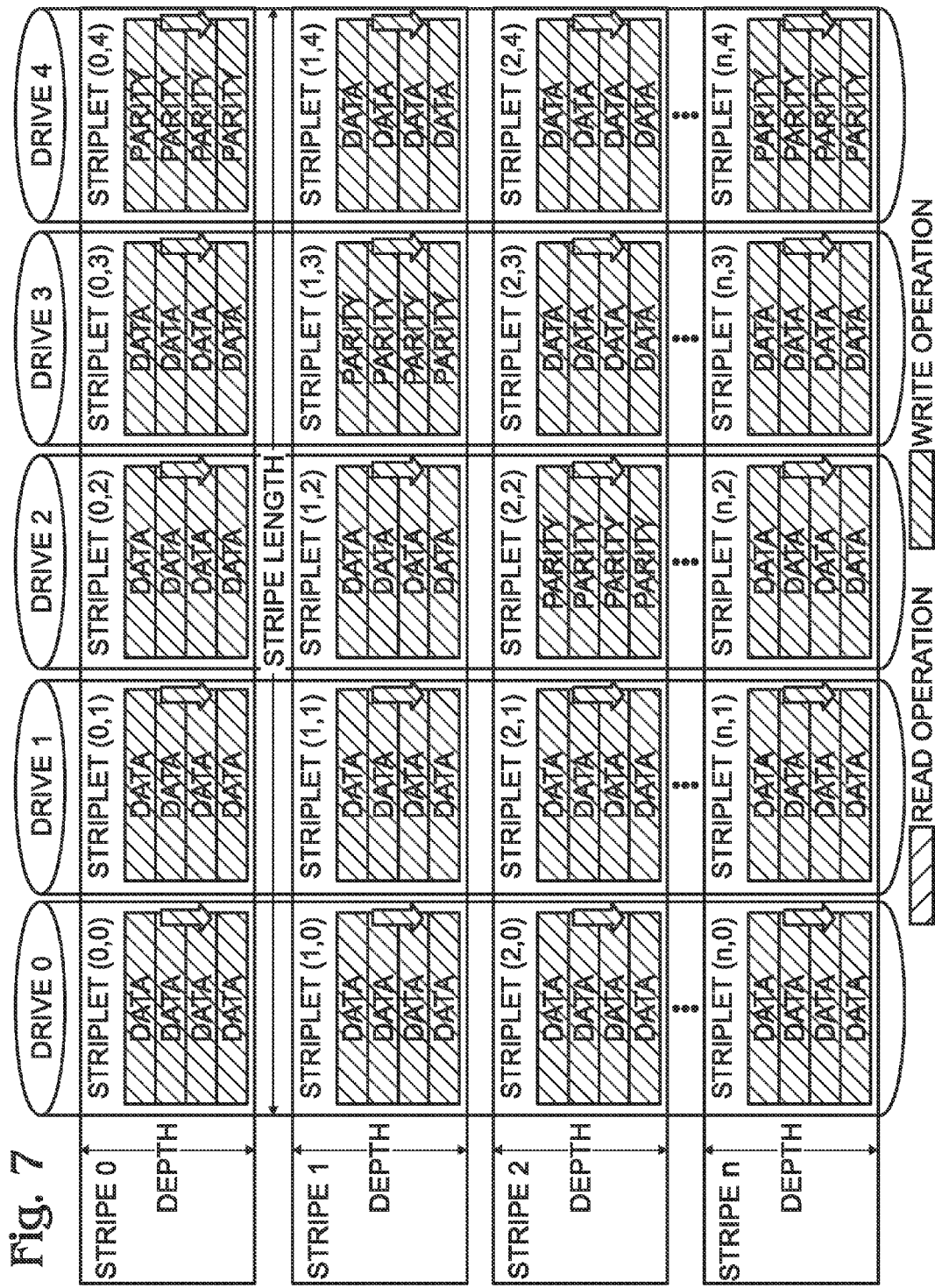
FIG. 7 is a diagram depicting a parity zeroing method for initializing bins in a RAID array.

FIG. 7 is a diagram depicting a parity zeroing method for initializing bins in a RAID array. As depicted, stripes 1, 2, 3, and n are stripes in the second group of bins. Considering both FIGS. 6 and 7, the microprocessor 616 directs the disk drive controllers 614 to initialize an integral number (n) of RAID array stripes in the second group of bins, where each bin includes a plurality of data and parity stripes. Alternately stated, the disk drive controllers 614 issue a plurality of zeroing commands to incrementally write zeros data into every data striplet and write zeros data into every parity striplet, for each strip in the second group of bins.

In this RAID 5 example, each stripe includes three data striplets and one parity striplet. However, it should be understood that the process is not limited to any particular number of bins in a bin group, strips in a bin, data striplets in a stripe, or parity striplets in a stripe.

In one aspect of the system, the RAAI memory 610 maintains a parity construction progress record (PCPR) 624 of completely initialized bins. When the microprocessor 616 receives host-generated data to be written into a bin, it accesses the PCPR 624. The microprocessor 616 directs the disk drive controllers 614 to use a peer-read I/O write process to write the data to the bin in response to the bin having a non-previously constructed parity. Alternately, the microprocessor 616 directs the disk drive controllers 614 to use a Read-Modify-Write (RMW) I/O write process to write the data to the bin in response to the bin having a previously constructed parity.

Figure 8:
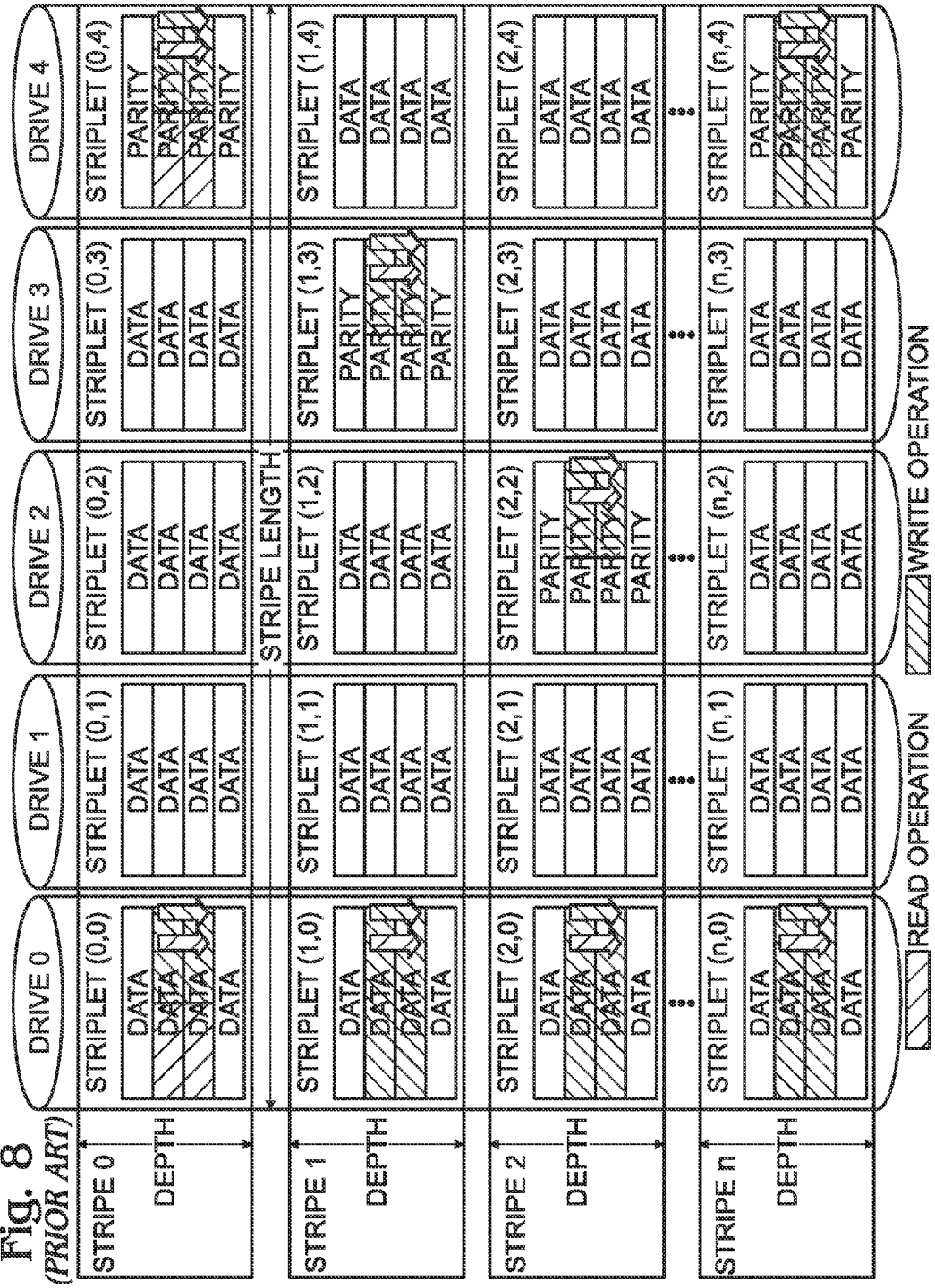
FIG. 8 is a diagram depicting the RMW I/O write process (prior art).

FIG. 8 is a diagram depicting the RMW I/O write process (prior art).

Returning the FIG. 6, in another aspect the BAT 619 maintains a host activity register 626 and sets a host activity flag for a bin, in response to writing host-generated data into the bin prior to initialization. Then, the microprocessor 616 selects the zeroing initialization process for the second group of bins response to accessing the host activity register 626 and verifies that the host activity flag has not been set for the second group of bins. Alternately, the microprocessor 616 selects the parity reconstruction initialization process for the first group of bins in response to accessing the host activity register 626 and verifies that the host activity flag has been set for the first group of bins.

In a different aspect, the microprocessor 616 interrogates the disk drive controllers 614 to identify drives 604 in the RAID array 602 capable of receiving a "WriteRepeatedly" command. A "WriteRepeatedly" command writes a host-generated data pattern repeatedly to media in an identified drive. Many RAID arrays are currently enabled to use a "write same" command, which is an example of a "WriteRepeatedly" command. Then, the microprocessor 616 directs the disk drive controllers 614 to initialize the second group of bins using the "WriteRepeatedly" command to simultaneously write zeros data into the identified drives.

Figure 9:
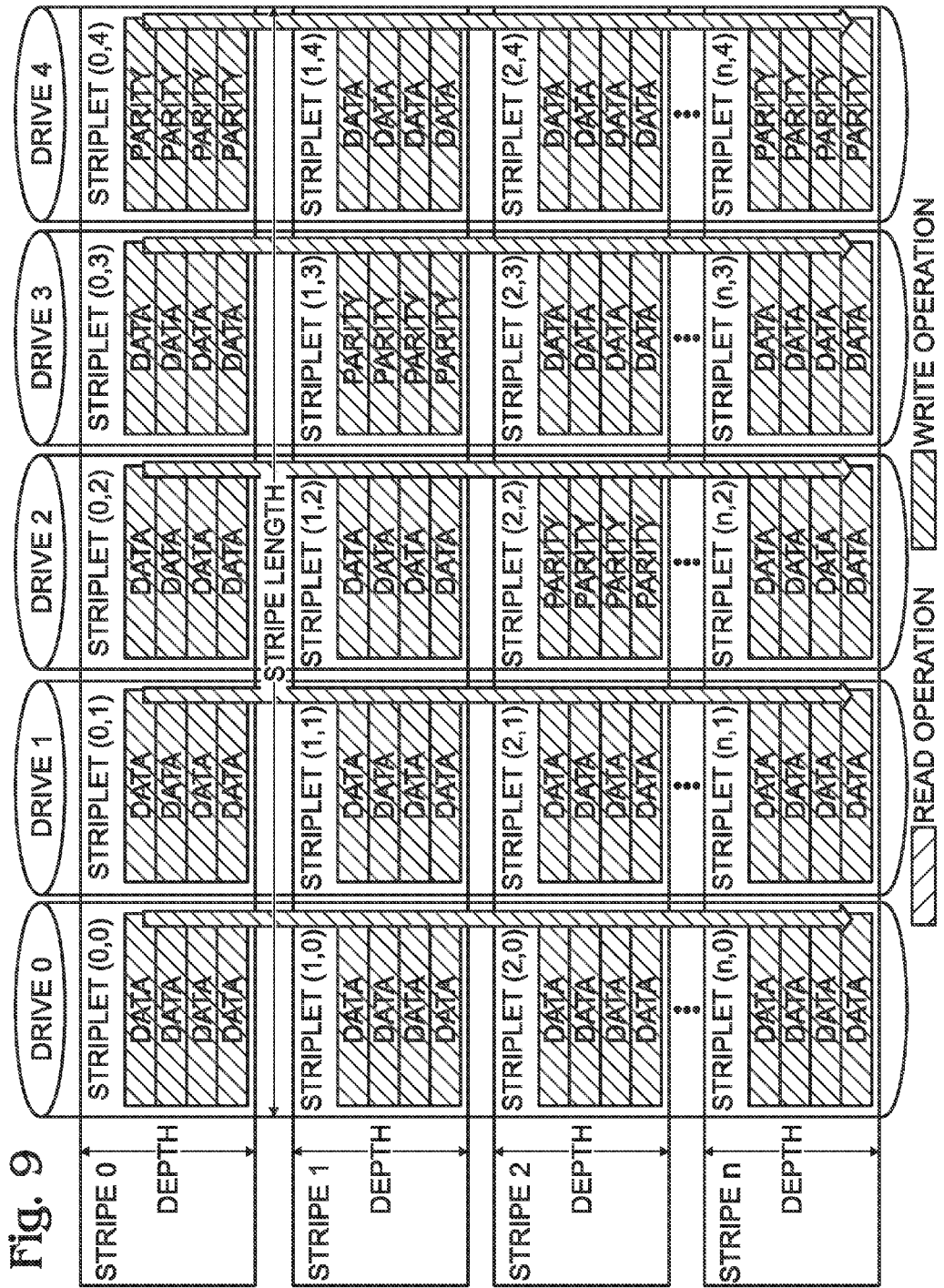
FIG. 9 is a diagram depicting an offline initialization process.

FIG. 9 is a diagram depicting an offline initialization process. Considering FIGS. 6 and 9, in one related aspect the microprocessor 616 may direct the disk drive controllers 614 to completely initialize identified drives while the array is offline by sending a single "WriteRepeatedly" command. In another related aspect, the disk drive controllers 614 use the "WriteRepeatedly" command to initialize the second group of bins by sending the "WriteRepeatedly" command and a zeros data pattern to each identified drive 604. The microprocessor 616 monitors each identified drive to determine if the transfer of the zeros data pattern to media in the identified drives is complete.

Figure 10:
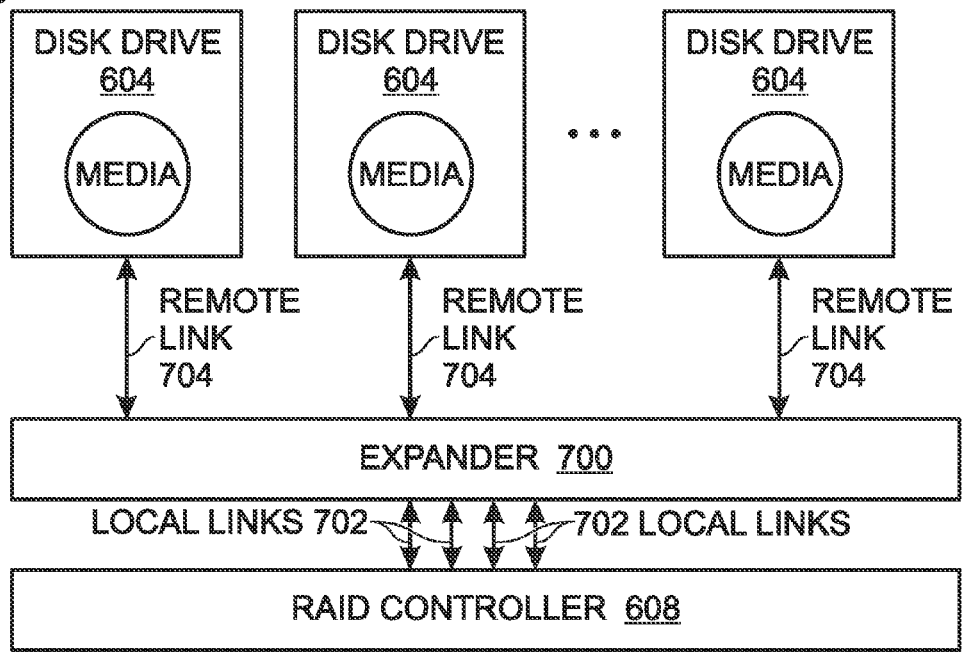
FIG. 10 is a schematic block diagram depicting a disk drive controller connected to a plurality of disk drives.

FIG. 10 is a schematic block diagram depicting a disk drive controller connected to a plurality of disk drives. As shown, a disk drive controller 608 is connected to an expander 700 through a local link 702, and the expander 700 is connected to a plurality of disk drives 604 identified as capable of receiving the "WriteRepeatedly" command, through a corresponding plurality of remote links 704. Alternately but not shown, the disk drive controller 608 can be connected to a plurality of disk drives identified as capable of receiving the "WriteRepeatedly" command, without the use of an expand where the link type can be either remote or local.

FIG. 11 is a diagram summarizing the above-mentioned processes for efficiently initializing and writing data into a RAID array. Viewing the left side of the bins, a determination has been made of whether data has been written into various bins prior to initialization ("is Written"=TRUE). For example, host-generated data was written into bins 0 and n, but not bins 1, 2, and 3. Viewing the right side of the bins, this determination results in a decision as the whether the parity reconstruction method (bins 0 and n) or the zeroing method (bins 1-3) should be used for initialization.

Viewing the right side of the bins, a determination is made as to whether the bins have been previously constructed or initialized. For example, bins 0, 1, and 2 are shown as constructed. Viewing the left side of the bins, this determination results in a decision as to whether a RMW (bins 0-2) or peer-read (bins 3-n) processes should be used to write data in the most efficient manner.

Functional Description

The RAID Array Auto-Initializer is appropriate for RAID disk arrays that incorporate redundancy by using parity, such as RAID 5 and RAID 6, or derivatives of these, such as RAID 50, and RAID 60. More primitive arrays, such as RAID 1, and 10 do not require initialization per se, but can benefit from initialization, so that they can be verified as part of ongoing periodic array integrity maintenance. For this reason, even these more primitive RAID levels are also addressed in this invention. In fact, the existing RAID levels referenced above are just used as examples to make clear to a person skilled in the art as to how a RAID Array Auto-Initializer may be enabled. The concepts presented herein are applicable to future defined RAID arrays, which might be comprised of one or more drives forming a generic "data group", and one or more drives forming a generic "parity group". So there is no limit implied by using existing defined RAID levels as examples. Whatever the RAID level, the present invention system speeds disk array initialization, as all drives connected to the RAID controllers are able to simultaneously stream during initialization. The invention is scalable, as all drives connected to the RAID array controllers are able to stream during initialization, regardless of the number of drives, and regardless of how the drives are connected to the disk array controller (directly attached or behind an expansion system).

Figure 12:
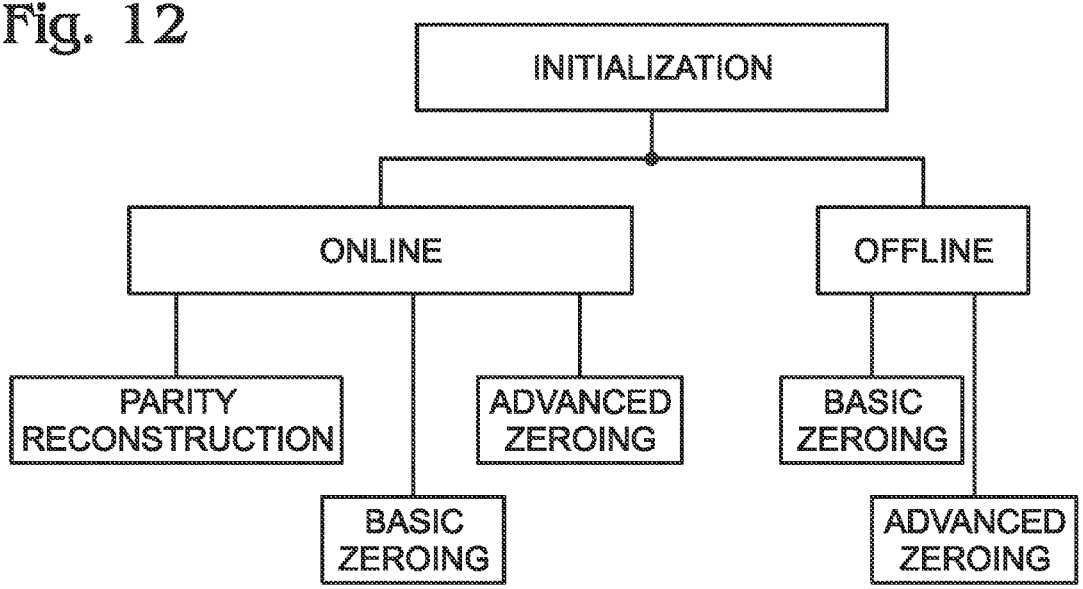
FIG. 12 is a drawing categorizing the basic initialization processes.

FIG. 12 is a drawing categorizing the basic initialization processes. As noted above, the present invention supports initialization in both the offline and online modes. The online mode is further divided into parity construction (prior art) and zeroing. The zeroing mode is further divided into basic and advanced zeroing.

Offline: In this usage mode the array remains unavailable for normal data access write/read during initialization. Only after initialization is complete, may the array be accessed to write/read content data. The advantage of this mode is the fastest initialization. The downside is that the array is not available until initialization is complete. Since the only writes to the array (and there are no reads) are for initialization, the firmware can initialize the array in the most efficient mode possible, writing large quantities of data with single "WriteRepeatedly" commands, and writing all drives simultaneously.

The offline initialization aspect of the invention takes advantage of the localization of data read/writes by an operating system (OS), as well as the "WriteRepeatedly" capability. The "WriteRepeatedly" command permits a large chunk (up to the entire user area of the disk) to be written with identical data, using a single command. The RAAI proceeds along five phases:

1) Capability identification—The RAID controller processor determines whether the drive has support for any methodology to partially automate the initialization process. For example the "SCT write same command" in the ATA-8 specification is one methodology for accomplishing RAAI.

2) Command transfer—The RAID controller processor issues the appropriate commands to the disk device to initiate the auto initialization process.

3) Data transfer—The RAID controller processor provides the initial block of data to be duplicated throughout the drive.

4) Periodic Status to determine percentage complete—Array initialization can take many hours. Users will need frequent updates on progress.

5) Completion

So, if the ATA-8 "write same" command is used as an example, in the offline mode the array controller processor need issue only one command per drive, and every drive is initialized simultaneously. The array controller processor may check status periodically, reading the logical block address (LBA) of the drive's current activity, to be able to report to the user a percentage completion statistic.

Online-parity reconstruction: In this usage mode the array is available for normal data access read/write during initialization. The data written during this usage mode is fully redundant. The advantage of this mode is immediate array availability for normal read/write access. The downside is lower performance of the array until initialization is complete, and initialization is much slower than in offline mode. In this mode, if a write to the array is less data than a full stripe write, the remainder of the stripe is read, parity calculated, and then a full stripe write done (peer-read). This allows for full and immediate redundancy of all written data. This mode is based upon the logical assumption that an OS will not try to read a striplet that it hasn't written. This mode is a conventional initialization process.

Online-basic zeroing: This usage mode has the advantage that the array is immediately useful for normal read/write, and the array remains fully redundant. Initialization is much faster than using the parity reconstruction method. This mode takes advantage of data activity performed by a host-connected operating system. Generally, an operating system writes only to a small fraction of the disk during the first few hours of operation (during array initialization). These areas can be initialized by a mixture of parity reconstruction (where data has been written by the host) and zeroing methods (where data has not been written).

This aspect of the invention takes advantage of the localization of data reads/writes to a disk by an OS especially during the first few hours of array utilization (after array creation). The basic zeroing process breaks the array into multiple bins, i.e., collections of stripes. Alternately, this organization may be seen as the breaking of each disk into "binlets", which are collections of striplets. The bins can be various sized and follow two rules. First, a bin must be an integral number of stripes. Second, a bin must be initialized the same way, either zeroed or parity reconstruction, but not both. Since zeroing a bin is much faster than a parity reconstruction, all bins without OS activity detected are zeroed. Only those with active OS activity are initialized with parity reconstruction techniques.

Online-advanced zeroing: This usage mode is an online initialization process that uses a "WriteRepeatedly" command to write large sections of the disk with a single command and identical data, making the zeroing initialization method more efficient.

One feature of the invention is based upon a dynamic interpretation of OS write/read patterns. Every OS (e.g., Linux, Windows, FreeBSD, MAC, etc) handles disk I/O and File Systems differently. In addition, versions within the same OS handle disk I/O differently. Further, the same OS (especially Linux) can support a half dozen file systems all doing disk I/O differently. Also, an application on an operating system may cause the OS to handle disk PO differently. OS configuration options, like caching, can further complicate the patterns of disk I/O. Therefore, it is difficult to dynamically determine which contiguous blocks of sectors of the disk can be initialized by zeroing methods because they are not subject to OS I/O, and which contiguous blocks of sectors must be initialized with the slower parity reconstruction processes.

Another feature of the invention is exemplified in the use of "WriteRepeatedly" commands, such as the ATA-8 "write same" command. Generally, the concept of initialization being intelligently controlled by the disk drive is a novel proposition. Further, the combination of the "binning" concept with the use of "WriteRepeatedly" commands presents initialization options that were not previously recognized in the art.

FIG. 13 is a flowchart illustrating a method for efficiently initializing a RAID array. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method star at Step 1300.

Step 1302 monitors a first group of bins in a RAID array to which data access write operations have occurred while the array is online. Step 1304 monitors a second group of bins to which data access write operations have not occurred while the array is online. Step 1306 initializes the first group of bins using a parity reconstruction process, and Step 1308 initializes the second group of bins using a zeroing process. Step 1308 initializes an integral number of RAID array stripes, where each bin includes a plurality of data and parity stripes. More explicitly, Step 1308 may use a plurality of zeroing commands to incrementally, for each strip in the second group of bins: write zeros data into every data striplet; and, write zeros data into every parity striplet.

In one aspect of the method, Step 1301*a* maintains a bin access table (BAT) host activity register. Step 1301*b* sets a host activity flag in the BAT host activity register for a bin, in response to writing host generated data into the bin prior to initialization. Thus, initializing the first group of bins using a parity reconstruction process in Step 1306 includes using the parity reconstruction process in response to the host activity flag being set for the first group of bins. Likewise, initializing the second group of bins using a zeroing process in Step 1308 includes using a zeroing process in response to the host activity flag not being set for the second group of bins.

In another aspect, Step 1301*c* identifies drives in the RAID array capable of receiving a "WriteRepeatedly" command to write zeros data, where a "WriteRepeatedly" command writes a host-generated data pattern repeatedly to media in an identified drive. In one variation a plurality of "WriteRepeatedly" capable drives may be identified, which are connected to a RAID controller through either a remote or local link, see FIG. 10. Regardless of the connection, initializing the second group of bins in Step 1308 may then include using the "WriteRepeatedly" command to simultaneously write zeros data into the identified drives.

More explicitly, using the "WriteRepeatedly" command to initialize the second group of bins in Step 1308 may include substeps (not shown). Step 1308*a* sends the "WriteRepeatedly" command to each identified drive. Step 1308*b* transfers a zeros data pattern to each identified drive, and Step 1308*c* monitors to determine if the transfer of zeros data to media in the identified drives is complete.

In a different aspect, Step 1301*d* completely initializes identified drives while the array is offline by sending a single "WriteRepeatedly" command, in response to identifying drives in the RAID array capable of receiving the "WriteRepeatedly" command (Step 1301*c*).

In another aspect, Step 1310 maintains a parity construction progress record (PCPR) of initialized bins. If Step 1312 receives host-generated data to be written into a bin, then Step 1314 uses a peer-read I/O write process to write the data into the bin in response to the bin not being recorded in the PCPR. Alternately, in response to the bin being recorded in the PCPR, Step 1316 uses a Read-Modify-Write (RMW) I/O write process to write the data into the bin.

Figure 14:
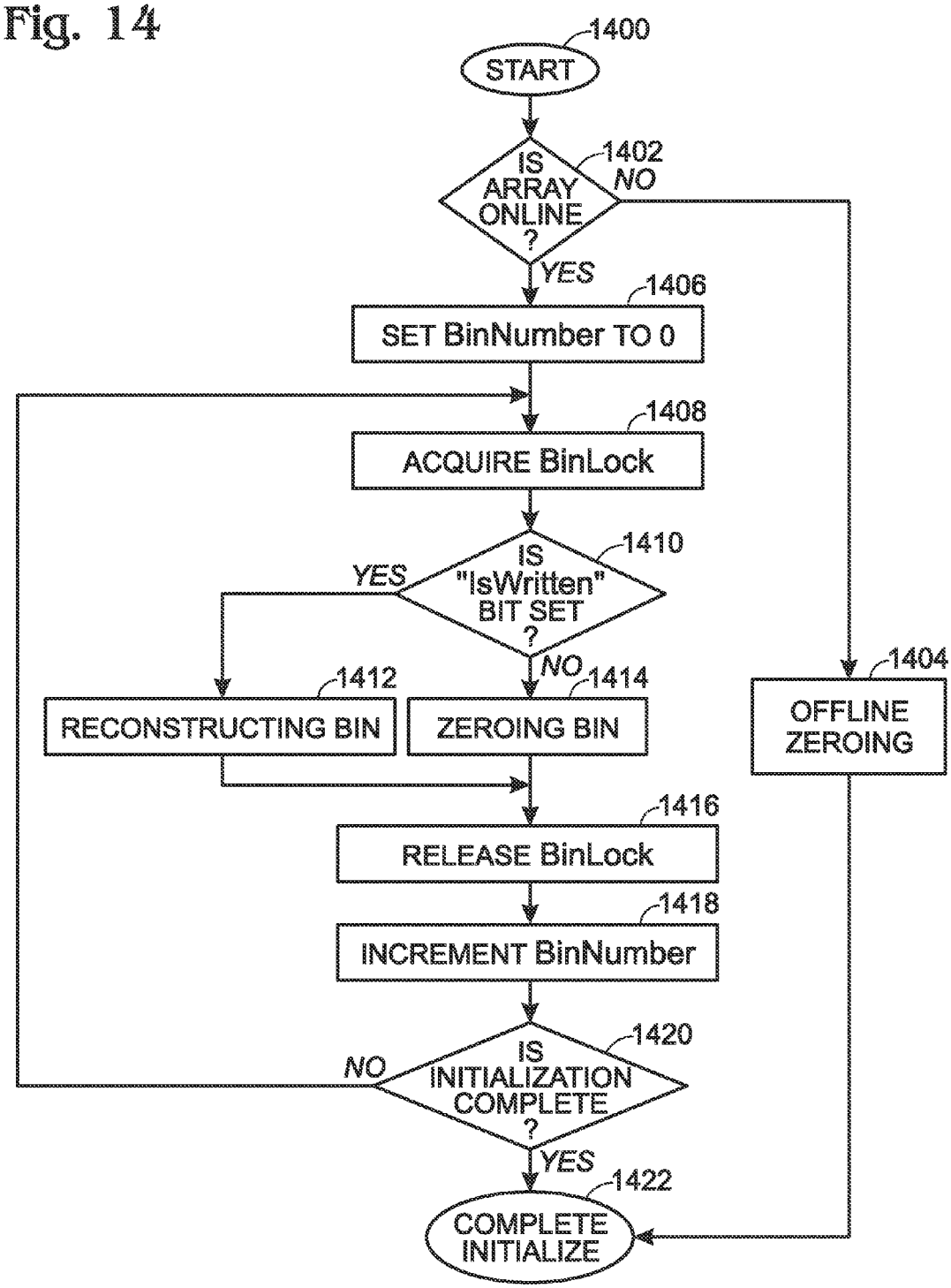
FIG. 14 is a flowchart illustrating a process for selecting a RAID array initialization method.

FIG. 14 is a flowchart illustrating a process for selecting a RAID array initialization, method. The method starts at Step 1400. In Step 1402 a determination is made as to whether the array is online. If not, an offline zeroing method is used (Step 1404), in Step 1406 the first bin is selected (e.g., bin 0), and in Step 1408 the bin is locked. When locked, no host-generated data may be written into the bin. In Step 1410, a determination is made as to whether data has been written into the bin. As described above, if data has been written, then a host activity flag is set in a host activity register in the BAT. If data has been written, the parity reconstruction method is used for initialization (Step 1412). Otherwise, Step 1414 uses a zeroing initialization process. Steps 1416 and 1418 respectively release the bin lock and increment the bin number. In Step 1420 a determination is made as to whether the initialization is complete. If not complete, the method returns to Step 1402. If complete, the method goes to Step 1422.

Figure 15:
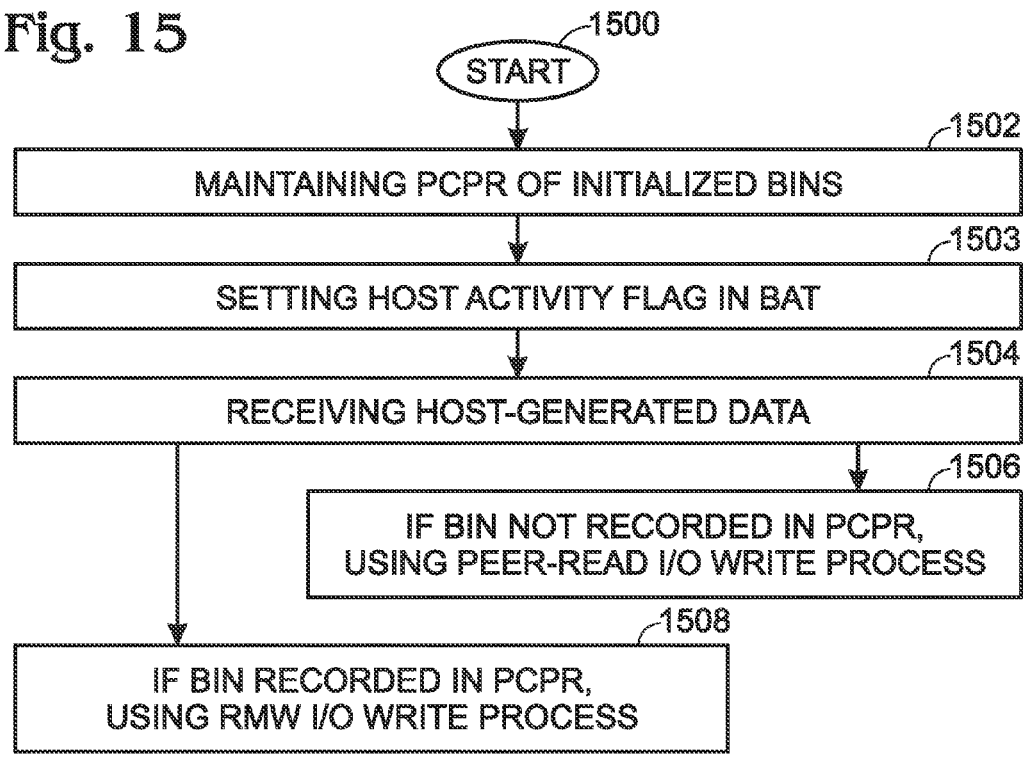
FIG. 15 is a flowchart illustrating a method for efficiently selecting a host write process for optimal data redundancy and performance in a RAID.

FIG. 15 is a flowchart illustrating a method for efficiently selecting a host write process for optimal data redundancy and performance in a RAID. The method starts at Step 1500. Step 1502 maintains a parity construction progress record (PCPR) of initialized bins, where each bin includes a plurality of data and parity stripes. Step 1503 sets a host activity flag in a bin access table (BAT) host activity register for a bin, in response to writing host-generated data into the bin prior to initialization. In Step 1504 host-generated data is received, which is to be written into a bin. In response to the bin not being recorded in the PCPR, Step 1506 uses a peer-read I/O write process to write the data into the bin. In response to the bin being recorded in the PCPR, Step 1508 uses a Read-Modify-Write (RMW) I/O write process to write the data into the bin.

FIG. 16 is a flowchart illustrating a variation in the method for efficiently selecting a host write process for optimal data redundancy and performance in a RAID. The method starts at Step 1600. Step 1602 receives a host-generated write command. In Step 1604 the command is decoded, and in Step 1606 the bin and stripe numbers are identified. In Step 1608 a determination is made as to whether the bin has already been constructed by using the PCPR information. If it has been constructed, the data is written using a RMW I/O write process (Step 1610). If not, the bin is locked in Step 1612, and Step 1614 sets the "is Written" bit for the locked bin. This process is also referred to herein as updating the BAT. A peer-read I/O write process is performed in Step 1618 and Step 1618 releases the bin lock. The method is completed at Step 1620.

Figure 17:
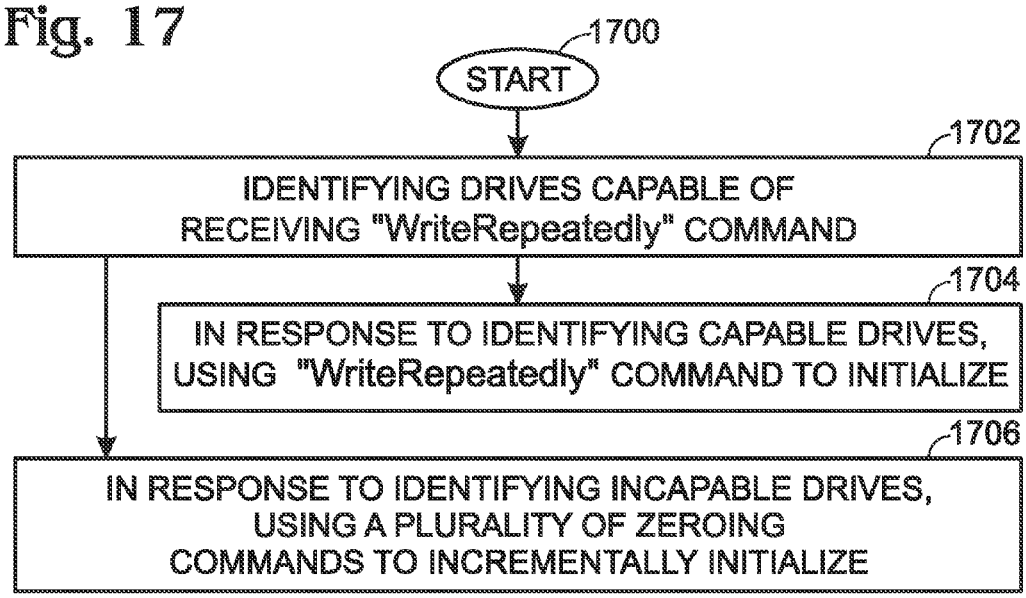
FIG. 17 is a flowchart illustrating a method for efficiently initializing a RAID array.

FIG. 17 is a flowchart illustrating a method for efficiently initializing a RAID array. The method starts at Step 1700. Step 1702 identifies drives in a RAID array capable of receiving a "WriteRepeatedly" command to write zeros data, where a "WriteRepeatedly" command writes a host-generated data pattern repeatedly to media in an identified drive. In response to identifying drives capable of receiving the "WriteRepeatedly" command, Step 1704 initializes bins in the identified drives using the "WriteRepeatedly" command to simultaneously write zeros data into the identified drives. In response to identifying drives incapable of receiving the "WriteRepeatedly" command, Step 1706 initializes bins in the incapable drives using a plurality of zeroing commands to incrementally write zeros data into every data and parity striplet.

Figure 18:
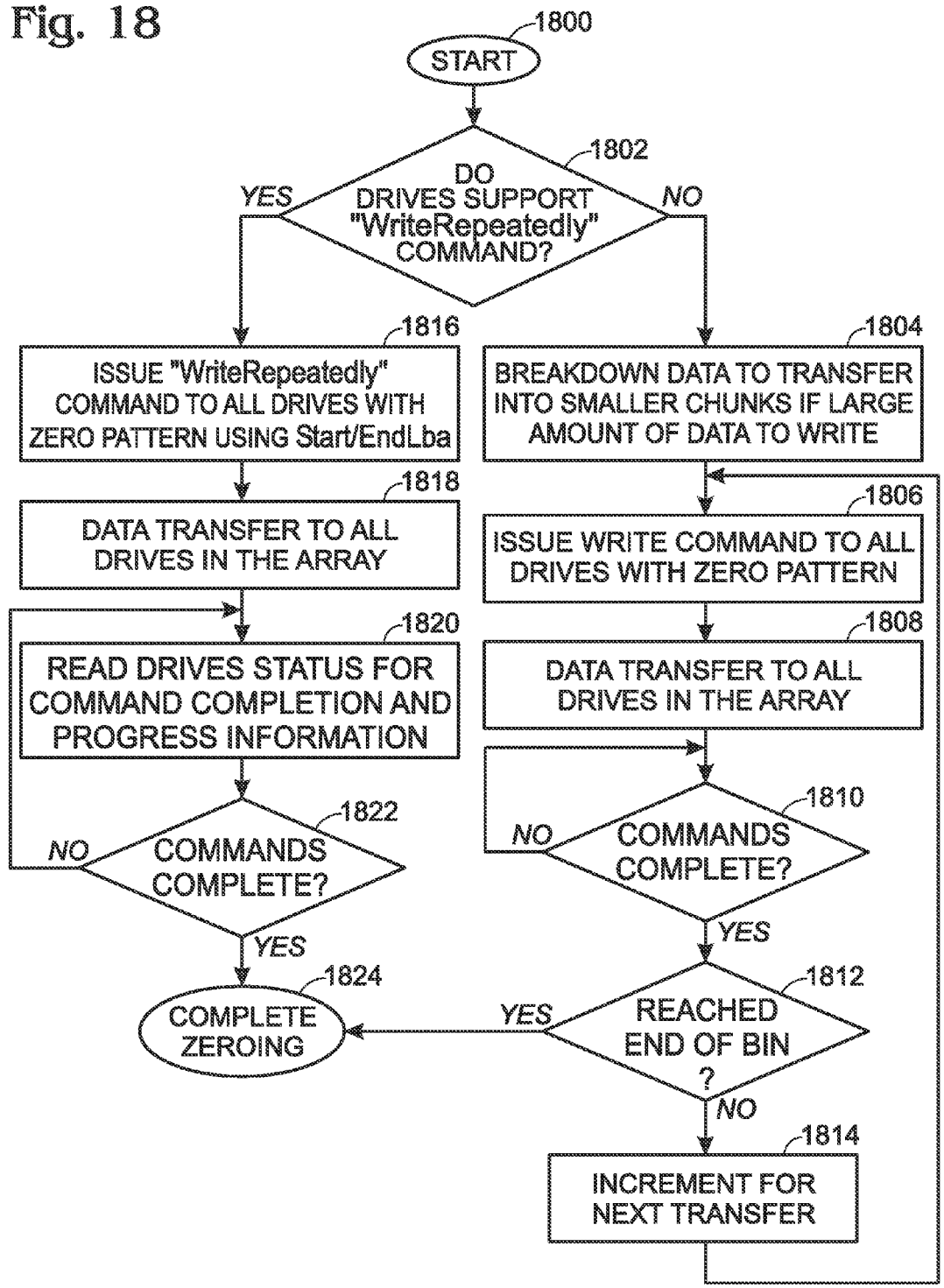
FIG. 18 is a flowchart illustrating a variation in the method for efficiently initializing a RAID array.

FIG. 18 is a flowchart illustrating a variation in the method for efficiently initializing a RAID array. The method starts at Step 1800. Step 1802 identifies drives capable of receiving and responding to a "WriteRepeatedly" command. For drives lacking the capability, Step 1804 breaks the zeros pattern, data into segments or "chunks" for transfer. Step 1806 issues a write command and Step 1808 transfers data. In Step 1810 a determination is made as to whether the transfer is complete. If the transfer is complete, Step 1812 determines if the bin is initialized. If not, the segment (chunk) number is incremented for the transfer of more zeros data (Step 1814).

If Step 1802 determines that the drives are capable of receiving "WriteRepeatedly" commands, Step 1816 issues the WriteRepeatedly" command, and Step 1818 transfers the zeros data pattern. Step 1820 reads the drives to determine status. Step 1822 determines if the data transfer is complete. If not complete, the process returns to Step 1820. If complete, the process terminates at Step 1824.

A system and method for efficiently initializing a RAID array has been presented. Likewise, processes have been presented for efficiently writing host-generated data into a RAID array. Some examples of particular RAID levels, initialization routines, and I/O write processes have been given to illustrate the invention. However, the invention is not limited to just these examples. Other variations and embodiments of the invention will occur to those of skill in the art.

We claim:

1. In a redundant array of independent disks (RAID), a method for efficiently initializing a RAID array, the method comprising:
   a RAID controller monitoring a first group of bins in a RAID array to which data access write operations have occurred while the array is online;
   monitoring a second group of bins to which data access write operations have not occurred while the array is online;
   initializing the first group of bins using a parity reconstruction process; and,
   initializing the second group of bins using a zeroing process.

2. The method of claim 1 wherein initializing the second group of bins includes initializing an integral number of RAID array stripes, where each bin includes a plurality of data and parity stripes.

3. The method of claim 1 wherein initializing the second group of bins using the zeroing process includes using a plurality of zeroing commands to incrementally, for each strip in the second group of bins:
   write zeros data into every data striplet; and,
   write zeros data into every parity striplet.

4. The method of claim 1 further comprising:
   maintaining a bin access table (BAT) host activity register;
   setting a host activity flag in the BAT host activity register for a bin, in response to writing host-generated data into the bin prior to initialization;
   wherein initializing the first group of bins using a parity reconstruction process includes using the parity reconstruction process in response to the host activity flag being set for the first group of bins; and,
   wherein initializing the second group of bins using a zeroing process includes using a zeroing process in response to the host activity flag not being set for the second group of bins.

5. The method of claim 1 further comprising:
   identifying drives in the RAID array capable of receiving a "WriteRepeatedly" command to write zeros data, where a "WriteRepeatedly" command writes a host-generated data pattern repeatedly to media in an identified drive; and,
   wherein initializing the second group of bins includes using the "WriteRepeatedly" command to simultaneously write zeros data into the identified drives.

6. The method of claim 5 further comprising:
   in response to identifying drives in the RAID array capable of receiving the "WriteRepeatedly" command, completely initializing identified drives while the array is offline by sending a single "WriteRepeatedly" command.

7. The method of claim 5 wherein identifying drives in the RAID array capable of receiving the "WriteRepeatedly" command includes identifying a plurality of disk drives connected to a RAID controller through a link selected from a group consisting of remote and local links.

8. The method of claim 5 wherein using the "WriteRepeatedly" command to initialize the second group of bins includes:
    sending the "WriteRepeatedly" command to each identified drive;
    transferring a zeros data pattern to each identified drive; and,
    monitoring to determine if the transfer of zeros data to media in the identified drives is complete.

9. The method of claim 1 further comprising:
    maintaining a parity construction progress record (PCPR) of initialized bins;
    receiving host-generated data to be written into a bin;
    in response to the bin not being recorded in the PCPR, using a peer-read I/O write process to write the data into the bin; and,
    in response to the bin being recorded in the PCPR, using a Read-Modify-Write (RAM) I/O write process to write the data into the bin.

10. In a redundant array of independent disks (RAID), a method for efficiently selecting a host write process for optimal data redundancy and performance, the method comprising:
    a RAID controller maintaining a parity construction progress record (PCPR) of initialized bins, where each bin includes a plurality of data and parity stripes;
    receiving host-generated data to be written into a bin;
    in response to the bin not being recorded in the PCPR, using a peer-read I/O write process to write the data into the bin; and,
    in response to the bin being recorded in the PCPR, using a Read-Modify-Write (RMW) I/O write process to write the data into the bin.

11. In a redundant array of independent disks (RAID), a method for efficiently initializing a RAID array, the method comprising:
    a RAID controller identifying drives in a RAID array capable of receiving a "WriteRepeatedly" command to write zeros data, where a "WriteRepeatedly" command writes a host-generated data pattern repeatedly to media in an identified drive;
    in response to identifying drives capable of receiving the WriteRepeatedly" command, initializing bins in the identified drives using the "WriteRepeatedly" command to simultaneously write zeros data into the identified drives; and,
    in response to identifying drives incapable of receiving the "WriteRepeatedly" command, initializing bins in the incapable drives using a plurality of zeroing commands to incrementally write zeros data into every data and parity striplet.

* * * * *